United States Patent [19]
Gunkel

[11] 3,720,159
[45] March 13, 1973

[54] FRUIT PRESS
[75] Inventor: Otto Gunkel, 71 Heilbronn, Germany
[73] Assignee: Schenk Filterbau Gesellschaft mit Beschrankter Haftung, Waldstetten, Germany; a part interest
[22] Filed: Feb. 24, 1971
[21] Appl. No.: 118,361

[30] Foreign Application Priority Data

Feb. 25, 1970 Germany ............... P 20 08 739.2

[52] U.S. Cl. ............................. 100/118, 100/151
[51] Int. Cl. ............................................ B30b 5/04
[58] Field of Search ...... 100/118, 116, 119, 120, 151, 100/152, 153, 154; 15/77

[56] References Cited

UNITED STATES PATENTS 679,463  7/1901  Long ........................ 100/194 X 2,824,320  2/1958  Teel ........................... 15/77

FOREIGN PATENTS OR APPLICATIONS 1,502,244  4/1969  Germany ..................... 100/118
1,502,249  2/1969  Germany ..................... 100/118

*Primary Examiner*—Peter Feldman
*Attorney*—Walter Becker

[57] ABSTRACT

A fruit press in which a press punch is moveable toward a bed member for pressing fruit mash to express juice therefrom. A grate band having spaced bars is moveable over the bed member and over the the grate band is a filter cloth. The mash is charged onto the cloth at one side of the press and is conveyed into the press by the filter cloth. An automatic controller controls the press punch so the mash on the cloth has the juice expressed therefrom over a period of about 2 to 4 minutes.

12 Claims, 6 Drawing Figures

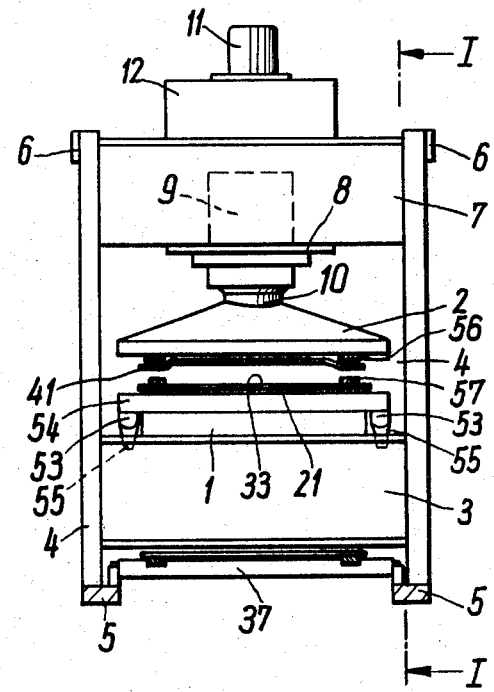
Fig. 2
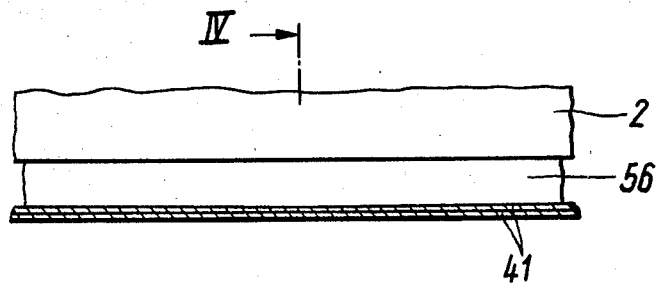
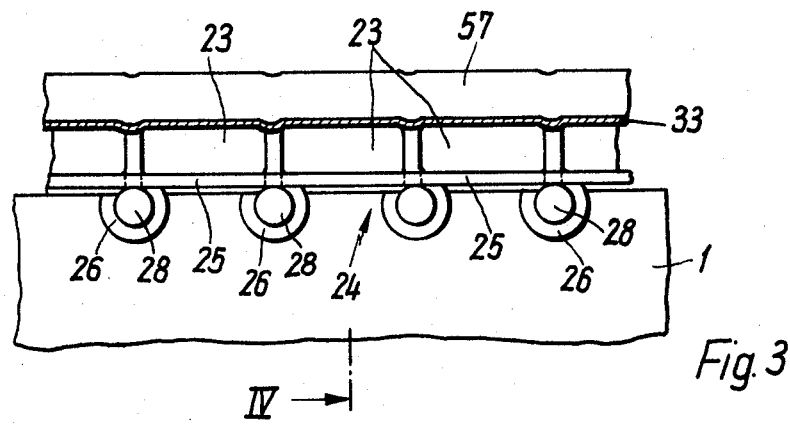
Fig. 3
Inventor:
Otto Gunkel

FRUIT PRESS

The present invention relates to a fruit press with a press stage in the form of a hand press, and with a grate band actuated step-wise by a charging device for the fruit mash to be squeezed, said grate band leading to the hand press. The grate band comprises transverse bars which, near the ends, are connected to transporting chains, or the like. The said grate band passes within the range of the press stage over a press table. The fruit press referred to above furthermore comprises an endless filter cloth which, at least within the range of the press stage, rests on the grate band.

It is an object of the present invention to provide a fruit press of the above mentioned type which will eliminate any difficulties with regard to the guide of the filter cloth and will also eliminate any difficulties with regard to cleaning and squeezing the fruit mash.

These objects and other objects and advantages of the invention will appear more clearly from the following specification, in connection with the accompanying drawings, in which:

FIG. 1 diagrammatically illustrates a longitudinal section through a fruit press according to the invention, said section being taken along the line I—I of FIG. 2.

FIG. 2 is a section taken along the line II—II of FIG. 1.

FIG. 3 illustrates on a considerably larger scale than FIG. 1 that portion of FIG. 1 which is located within the dot-dash circle marked by the reference character III.

FIG. 6 shows a section of the press, said section being taken along the line VI—VI of FIG. 1.

Figure 1:
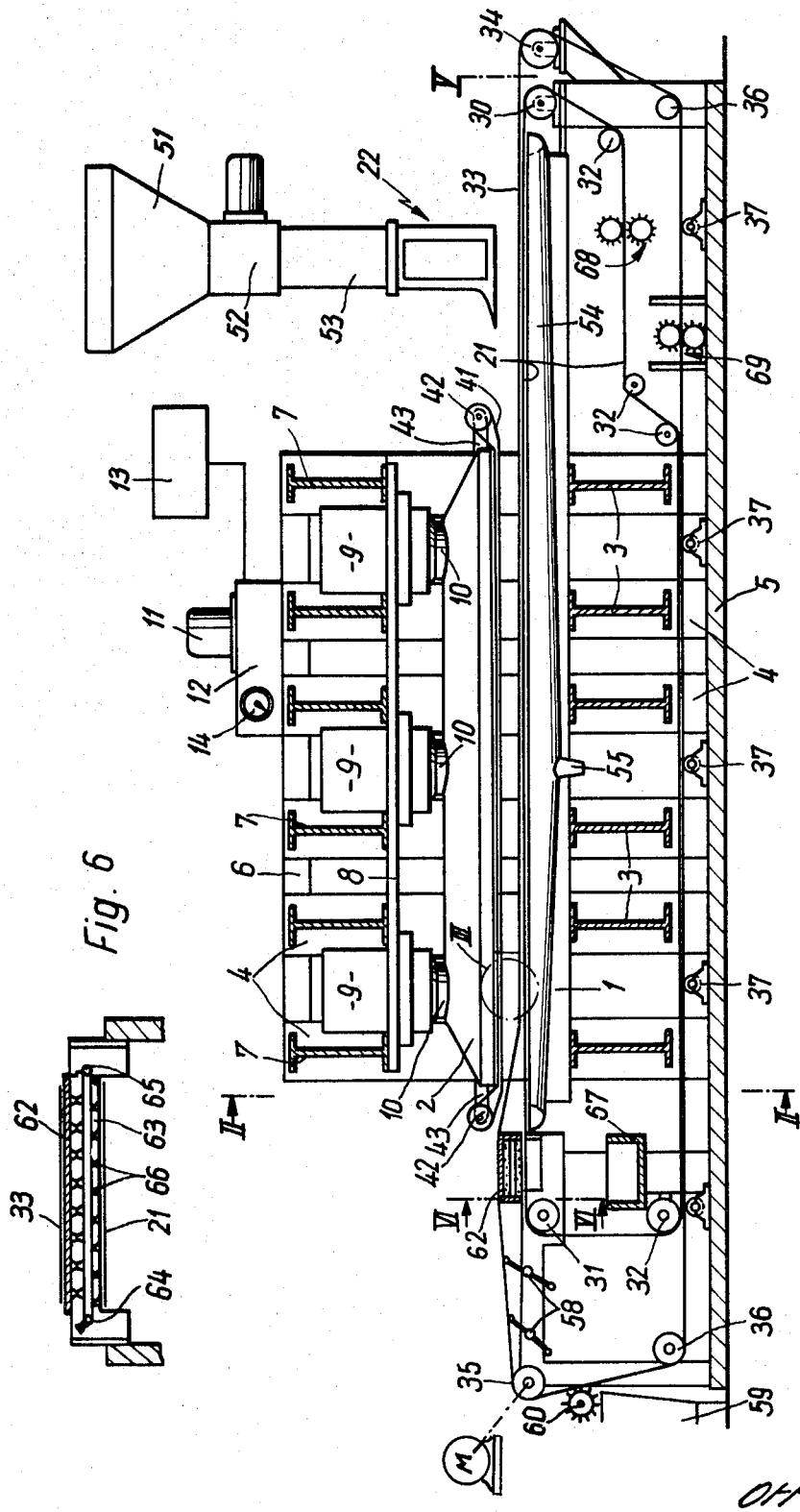

The fruit press according to the present invention is characterized primarily in that the discharge paths for the squeezed-out juice, as they are defined by the transverse bars, have a cross section of such magnitude that the squeezed-out juice will be able to flow off substantially under no pressure while the filter cloth will smoothly rest on the grate band over its full width. The fruit press according to the invention is furthermore characterized in that the transporting step of the grate band equals substantially the pressing or squeezing duration of the press stage. Furthermore, the squeezing duration is so controlled that the fruit mash which rests on the filter cloth without being laterally confined will, in a single squeezing operation lasting from about two to four minutes, be de-juiced to at least 70 percent in a cloudfree manner.

Numerous thorough tests have shown surprisingly that when the discharge paths for the squeezed juice have a sufficient cross section and when the squeezing is effected sufficiently slowly, the increase in pressure within the mash has such a relationship to the solidification of the first rather thin liquid mash that no lateral confinement of the fluid mash is necessary while a proper de-juicing of the mash will, nevertheless, be assured.

For a fast de-juicing of the mash, it is also important that the squeezing operation is effected in a single step because with a multi-step squeezing, the partially squeezed out mash will again relax and will suck back the juice into its pores without causing a change-off of the mash or otherwise bringing about a change which could aid the further squeezing out of the juice. Rather, when effecting multiple successive squeezing operations the respective previous condition has to be obtained before a further progress in the squeezing can be realized, so that the time therebetween is lost.

It is, therefore, advantageous to operate with as large surface punches as possible, if it is intended during one single pressing operation to obtain a great quantity of juice, while the squeezing has to be completed in one working operation.

It is, indeed, rather surprising that it is possible by means of a hand or punch press to be able to properly de-juice fruit mash without a lateral confinement of the mash on the grate band. This result requires that the discharge paths for the squeezed-out juice, which paths are defined by the transverse rods, have a sufficiently large cross section in order to permit the juice to flow off without being under pressure, so that by a damming up of the juice, or a clogging up of the discharge paths, no undue high pressure will build up in the mash, inasmuch as such undue pressure may bring about a lateral squeezing out of the mash between the press punch and the grate band. With the heretofore known fruit press, which forms the starting point for the present invention, the press table is provided with longitudinal grooves aiding in the discharge of the juice. The employment of such grooves is not expedient because these grooves can easily clog and are difficult to clean. Moreover, the flow-off discharge sections defined by such grooves will not be sufficient when the filter cloth which covers the transverse bars can, with the fruit mash, penetrate between the transverse bars of the grate band to such an extent that it will close up the spaces between said transverse bars to a considerable extent.

Therefore, it is provided according to a further development of the invention, that the press table is designed substantially plane, and that the transverse rods of the grate band are arranged spaced from each other by approximately 3 millimeters while having a height of at least 8 millimeters.

The slight distance between the transverse bars of the grate band is necessary in order to assure that the filter cloth will not be pressed into the intermediate spaces between adjacent transverse bars. If the filter cloth would be pressed too far between the transverse bars, this may result in the fact that a lower pressure will prevail in these areas than in the remaining sections of the mash so that the latter will not be completely squeezed, but will remain moist. Moreover, there exists the danger that at these areas, the mash will be pressed through the meshes of the filter cloth, or will at least be pressed into said meshes to a considerable extent. Therefore, an increase in the spacing between the transverse bars is inexpedient. The stated height of the bars will then be sufficient to such an extent that between the bars, even with a mash under full pressure, a hollow chamber will remain which will be sufficient for a pressure-free juice discharge, even when the press table is substantially plane.

The edges of the transverse bars of the grate band may at least on that side be rounded off which faces the filter cloth so that the filter cloth will at the edges of the bars not be subjected to any undue wear and in particular will not be subjected to forces which may exert a cutting effect.

Also, the filter cloth has a certain influence on the juice withdrawal operation and the proper function of the machine, because the thickness of the filter cloth and the width of its meshes influence the withdrawal and flow-off of the squeezed-out juice and the quantity of juice absorbed by the cloth and also have an influence on the clogging of the cloth and the possibility of cleaning the cloth.

Experience has proved that the filter cloth which covers the grate band may have a weight of from 200 to 800 grams per square meter and may have a mash width of a maximum of 5 millimeters. Preferred, is a filter cloth with a surface weight of from 400 to 500 grams per square meter and a mash width of approximately 1 meter.

As mentioned above, a lateral confinement of the mash located on the grate band is not necessary during the squeezing-out operation. It can, however, not be avoided that the mash, during the squeezing operation, slightly flows outwardly and that therefore marginal zones will form in which the full pressing pressure will not prevail. These marginal zones therefore remain somewhat moist and reduce the maximum possible yield in fruit juice. In order to assure a proper squeezing out also of the marginal zones, an elastic strip edge may be provided at the bottom side of the otherwise smooth pre-punch at those areas which are located above the margins of the mash layer applied to the grate band. Within the range of this strip, an increased pressure will be exerted upon the margins of the mash layer which pressure will bring about a proper squeezing out of the mash in these marginal areas, as a result of which, the withdrawal of juice will be further improved. Generally, the press punch should be smooth on its side so that no hollow chambers will form into which quantities of squeezed-out juice could enter. These quantities of juice cannot generally flow off from the top side of the mash layer, but remain on the mash so that after the squeezing pressure has been relieved, they are again absorbed by the mash. A grooved bottom side of the squeezing punch therefore would result in a decreased yield in juice.

A similar effect, as obtainable with elastic strips on the bottom side of the press punch can, of course, also be realized with elastic strips provided at the margins of the filter cloth and extending on both sides of the applied mash layer. These strips have a relatively low height and do not serve as a lateral confinement of the mash layer, but serve to exert an additional pressure which will bring about also a proper squeezing out of the marginal portions of the mash as described above. The elastic strips on the press punch and/or the filter cloth may consist, for instance, of foam rubber material, or foamed synthetic material.

The flat engagement of the filter cloth on the grate band also within the region of the press stage, makes possible not only a proper guiding of this filter cloth, but offers the possibility of employing particularly simple and simultaneously effective means for guiding the filter cloth. Thus, according to one embodiment of the invention, the filter cloth has its longitudinal marginal areas provided with beads which extend over the lateral margins of the grate band and preferably and additionally engage guiding grooves of deviating rollers for the filter cloth. In this way, the filter cloth is along its entire length along which it rests on the grate band guided precisely parallel on the grate band. Also, at the deviating or reversing rollers, such lateral guiding takes place independently of whether the beads engage the marginal areas of the filter cloth at the end faces of the reversing rollers or whether they engage guiding grooves. Therefore, a lateral deviation of the cloth during the operation of the fruit press according to the invention is impossible. According to a preferred embodiment of the invention, the beads are formed by V-belts and the reversing rollers are provided with corresponding V-grooves. The application of V-belts not only assures a good lateral guiding, but also simultaneously assures a proper transfer of driving forces to the filter cloth which together with the grate band during the working of the machine has to be moved or advanced after each pressing or squeezing operation by the length of the press stage.

As will be evident from the above, the respective prevailing flow-off cross section for the fruit juice is of decisive importance. This flow-off cross section is determined by the space between the transverse bars of the grate band. When squeezing out the fruit mash, however, pulp is pressed through the filter cloth resting on the grate band so that this pulp will enter the spaces between the transverse bars. With increasing time of operation, therefore, the said intermediate spaces between the transverse bars clog up more and more so that the flow-off cross sections are reduced and consequently also the working quality of the press is affected. For this reason, it is of foremost importance that during the operation of the press, the grate band is repeatedly and carefully cleaned. In order to assure that this cleaning of the grate band may be effected automatically during the operation of the fruit press, according to a preferred embodiment of the present invention there is provided a brush which is moved parallel to the transverse bars. Rotating brushes extending transverse across the grate band, bring about only a superficial cleaning of the grate band inasmuch as their bristles do not enter into the spaces between the transverse bars and therefore cannot properly remove the pulp from these spaces as it is necessary for proper operation of the fruit press over a longer period of time. In contrast thereto, with a brush movable parallel to the transverse bars, the pulp between the transverse bars is pushed out therefrom so that a proper cleaning of the grate band will be assured.

A brush system suitable for a fruit press according to the present invention is, in a particularly simple manner, formed by a band which extends transverse to the grate band and over the entire width of the grate band while being passed over reversing rollers, one of which is driven. This band of the brush system is endless and contains a plurality of brush bodies or is covered with bristles. Such brush band not only will assure a highly satisfactory cleaning of the grate band, but will also require only a relatively small space so that the brush band can be arranged on the discharge side of the machine over a substantially horizontal section of the grate band. The mounting of the brush band in this way has the particular advantage that below the grate band a pan may be mounted for receiving the pulp material which has been removed by the brush band.

Referring now to the drawings in detail, the fruit press illustrated therein has a pressing stage in the form of a punch press which comprises a press table 1 and a press punch 2 located above the press table and adapted to be lowered and lifted relative thereto. The press table 1 is mounted on transverse beams 3 of a press frame which also comprises the lateral vertical supports or beams 4 and longitudinal beams 5, 6 interconnecting said vertical beams 4. In addition to the transverse beams 3, additional transverse beams 7 are connected to and arranged between the vertical beams 4. The transverse beams 7 are arranged in spaced relationship to and above the press table 1 while cylinders 9 of three hydraulic cylinder piston units rest by means of a common assembly plate 8 against the bottom side of said transverse beams 7. The pistons 10 of said cylinder piston units are connected to the press punches 2. The arrangement furthermore comprises a pump 12 driven by an electric motor 11 and adapted whenever desired through conduits (not shown) to convey oil under pressure to the cylinder 9. The supply of the oil under pressure for lowering and lifting the press punch 2 is controlled by means of a control device 13 which is connected to the pump or the electric motor 11 pertaining thereto. The control may be effected in conformity with time or in conformity with the respective desired pressure. If the control is effected in conformity with the respective pressure, a pressure gauge 14 will be arranged within the pump unit 12. The employment of three piston cylinder units makes it possible to uniformly actuate a punch 2 with a rather great surface whereby a uniform pressure can be exerted upon large surfaces without the necessity of making the punch particularly rigid or sturdy.

A grate band 21 passes over the press table 1. The purpose of this band 21 consists in conveying the fruit mash to be squeezed by the fruit press according to the present invention, from a charging device 22 to a press stage, in other words, to the press table below the press punch. As will be more clearly evident from FIGS. 3 and 4, the grate band comprises transverse bars 23, which near their ends are connected to chain members 24. According to the illustrated embodiment, these chain members 24 comprise plate-shaped sections 25, the ends of which are provided with rolled-in tongues 26 and 27 for receiving hinge bolts 28 adapted to receive chain links. The transverse bars 23 are connected to the plate-shaped sections 25 of the chain links, for instance, by means of rivets 29. The grate band 21 is, at both ends of the press table 1 passed over reversing rollers 30 and 31 and while guided by further rollers 32 passes below the transverse beams 3 carrying the press table 1 from the reversing roller 31 at the exit end of the press table back to the reversing roller 30 arranged at the input end of the press table. The reversing rollers are expediently formed by sprocket wheels engaged by transverse webs of the chain links, said transverse webs being formed by the rolled-in tongues 26. In this way, a slip-free and therefore precisely defined advance of the grate band will be possible. For purposes of driving the grate band, the deviating roller 31, preferably arranged at the exit end of the press table 1, is employed.

Within the range of the press table 1, the grate band 21 is covered by a filter cloth 33. This cloth 33 is passed over deviating rollers 34 and 35 of which roller 34 is located in the extension of the press table 1 in front of the input side roller 30 for the grate band whereas the other deviating roller 35 is arranged in spaced relationship to and behind the exit side roller 31 for the grate band 21. Further deviating rollers 36 serve for returning the filter cloth from the exit side roller 35 to the inlet side roller 34. The filter cloth likewise passes below the transverse beam 3 of the press frame and simultaneously passes along the there prevailing section of the grate band 21. Rollers 37 journalled on the lower longitudinal beams 5 of the press frame support those returning sections of the grate band 21 and the filter cloth 33 from below which are located below the transverse beam 3 of the press punch. The filter cloth must advance together with the grate band in the direction from the charging device 22 to the press stage. In order to obtain a definite advance also for the filter cloth, it is expedient to provide the filter cloth with a feed of its own. To this end, with the illustrated fruit press, the exit side roller 35 is driven in any convenient manner, for instance, by a motor M. In order also, in this instance, to assure a possibly slip-free movement of the filter cloth, the outer margin of the filter cloth is at its bottom side provided with a V-belt-shaped bead 38 (FIGS. 4 and 5) which engage corresponding V-grooves 39 provided in rollers 34 to 36 and especially in the driven roller 35. In addition to yielding a slip-free drive, the said V-shaped beads impart upon the filter cloth a good lateral guiding so that the filter cloth will be prevented from laterally wondering or shimmying on the deviating rollers in view of differences in the tension of the filter cloth. At the same time, a good guiding of the filter cloth 33 within the region of the press table 1 on the grate band is realized by the fact that the filter cloth which rests substantially flat on the grate band has its margins protrude at the ends of the transverse bars 23 while the V-belt-shaped bead rests upon the ends of the transverse bars.

A further filter cloth 41 passes over deviating rollers 42 which are journalled on the ends of the press punch 2, for instance, by means of arms 43. Filter cloth 41 passes in two layers along the bottom side of the press punch 2. Inasmuch as, during the pressing or squeezing operation said filter cloth 41 will, during the squeezing out of the juice, cover the fruit mash on the filter cloth 33 which covers the grate band 21, the filter cloth 41 may also be designated as cover cloth in order to distinguish it from the filter cloth resting on the grate band.

At the inlet side of the press stage, the press table 1 is extended beyond the press punch 2 to a point below the charging device 22. This charging device has a funnel 51 or another suitable supply container for the fruit from which the juice has to be squeezed out and also has a mill 52 adjacent said funnel, and a chute 53 leading from said mill directly to the grate band 21. Chute 53 has its end arranged adjustable in spaced relationship to and above the grate band so that the freshly ground fruit can be charged onto the grate band with a predetermined layer thickness and over a predetermined width, when the grate band with the filter cloth 33 advances in the direction toward the press stage. The thickness of the charged fruit layer may amount to from 3 to 5 centimeters depending on the type and the condition of the fruit to be pressed out.

The advancing step of the grate band and of the filter cloth has a length which approximately equals the length of the press punch 2 so that with each step, a layer of fresh fruit mash will be located below the entire press punch. Following each feeding or advancing step, the press punch 2 is lowered slowly so that with continuously increasing pressure, the fruit mash has its juice withdrawn within a time period of from about 2 to 4 minutes. The juice squeezed out from the fruit mash penetrates substantially the filter cloth 33 on the grate band and flows through the spaces between the transverse bars 23 of the grate band off from the substantially plane press table 1. The juice is collected in juice troughs 54 which surround the press table 1 and by means of non-illustrated hoses connected to connections 55 of the troughs is conveyed to suitable containers. A minor portion of the juice is pressed out from the mash in upward direction and is discharged through pores of the cover cloth 41 toward the side.

According to the illustrated embodiment, the transverse bars 23 of the grate band are spaced from each other by a distance of about 3 millimeters, while the height of said transverse bars is about 8 millimeters. These dimensions will assure that on one side the filter cloth 33 cannot be pressed too deeply between the transverse bars of the grate band and that also the mash cannot be pressed too strongly into the meshes of the filter cloth. Simultaneously, with this relatively short distances, no zones are formed in which, in view of the escape of the filter cloth, a reduced pressure could form, as a result of which, the juice would be withdrawn from the fruit mash only incompletely. On the other hand, the height of the transverse bars 23 will assure a sufficient cross section of the flow-off troughs defined by the transverse bars so as to assure a pressure-free discharge of the fruit juice. This pressure-free discharge of the fruit juice will, in its turn, bring about that within the mash, no unduly high counterpressure of the juice will build up which would otherwise result in the flowing of the mash all over the grate band. Therefore, it is surprisingly possible to leave the fruit mash moved onto the grate band by means of the filter cloth without lateral confinements. Consequently, as mentioned above, the filter cloth 33 may flatly rest upon the grate band 21. By means of the control device 13, as just mentioned, the squeezing time may be adjusted to from 2 to 4 minutes depending on the quality of the fruit mash, so that the juice will have sufficient time to leave the fruit mash. The juice withdrawal as realized during actual experiments amounts to from 70 to 80 percent. Moreover, the obtained juice is free from cloud formations.

In view of the absence of lateral confinements, it cannot be assured that the margins of the deposited mash layer are completely vertical and in particular remain vertical during the squeezing operation. Rather a certain inclination of these margins is to be expected which will bring about that the marginal zones of the mash during the squeezing operation are not under the load of the full pressure. In this way, certain losses in juice may be encountered. In order to avoid these losses, according to the embodiment of the present invention, the bottom side of the press punch 2 and also the top side of the filter cloth 33 resting upon the grate band 21 are, within the region of the margins, equipped with elastic strips 56, 57. These strips will assure that also the marginal portions of the mash layer will be subjected to the full press pressure so that also in this area a complete withdrawal of the juice will be effected. It is a matter of course that it will suffice to provide one of such steps only either on the punch 2 or on the filter cloth 33. The elastic strips are advantageously made of foam rubber material or of an elastic material of synthetic substance.

The property of the employed filter cloth is of importance with regard to the operation of the press according to the invention. As particularly suitable, it has been found to employ filter cloths which have a surface weight of about from 200 to 800 grams per square meter, and a mesh width up to a maximum of 5 millimeters. In this instance, it is expedient to employ a somewhat coarser cloth for the filter cloth resting on the grate band so that a good discharge of the juice will be possible. The cover cloth should have good suction properties so that the upper press cloth will draw or suck up the juice which leaves the mash in upward direction, and when the squeezing pressure subsides will not return the juice to the fruit mash, which at that time likewise has a good suction ability. Furthermore, the surface weight of the filter cloth resting on the grate band may be somewhat higher than the surface weight of the cover cloth because the cover cloth has two layers. Preferred values for the upper and lower filter cloth do not differ very much from each other, and with regard to the surface weight amount to approximately from 400 to 500 grams per square meter, while the values of the mesh width are about 1 millimeter.

Following the squeezing out of the juice, the press punch 2 is lifted again, and subsequently the grate band 21 with the filter cloth 33 is advanced by the length of the press punch. A new mash layer is brought into the press stage, while the squeezed-out pulp layer is moved out of the press stage. The cover cloth 41 is likewise moved because the pulp particles have dug themselves into the cover cloth. The pulp layer also adheres strongly to the lower filter cloth so that the pulp layer within the region of the exit deviating roller 42 for the cover cloth will continue adhering to the filter cloth 33, while the cover cloth rolls off the pulp layer. The separation of the pulp layer from the cover cloth is effected practically without leaving any residues so that additional cleaning means for the cover cloth will not be necessary. In order to assure that also a proper separation of the pulp layer from the filter cloth 33 will occur, beater means 58 are provided within the region between the exit side roller 31 for the grate band and the deviating roller 35 for the filter cloth. These beater means will, from the bottom side, beat loose the pulp layer lying on the filter cloth, so that the pulp layer will, at the exit side deviating roller 35 for the filter cloth 33, peel off from the filter cloth and drop into a container 59 provided therefor. Moreover, behind the exit side deviating roller 35 for the filter cloth 33 there is provided a brush 60.

Also, for cleaning the grate band, there is provided a brush 61. This brush 61 is located on the exit side of the press within the range between the end of the press table 1 and the exit side deviating roller 31. Brush 61 is thus located between the top side of the grate band 21 and the filter cloth 33 which passes over a housing 62 which covers the brush 61 from the top. Brush 61 is formed by an endless band 63 passing over two rollers 64 and 65 which are arranged within the region of the lateral margins of the grate band 21 so that the endless band 63 extends over the entire width of the grate band 21. Of these two rollers, 64 and 65, one of the rollers is driven and may be formed, for instance, directly by a motor of the external rotor type so that no additional space is required for the drive. Band 63 is covered with brush bodies 66, but could, of course, instead be covered with bristles. It will be obvious that the brush bodies 66 guided parallel to the grate bars of the grate band 21 have their brushes adapted to engage deeply between the transverse bars of the grate band so that a proper cleaning of the grate band will be assured also within the region of the spaces between the transverse bars. Therefore, these spaces will always be free from pulp material and will even over long periods of operation assure a proper discharge of the juice and thereby a proper functioning of the press. Below brush 61 there is provided a container 67 for collecting the pulp material which has been removed by means of brush 61. This container may be moved laterally out of the fruit press in order to discard the pulp.

Figure 4:
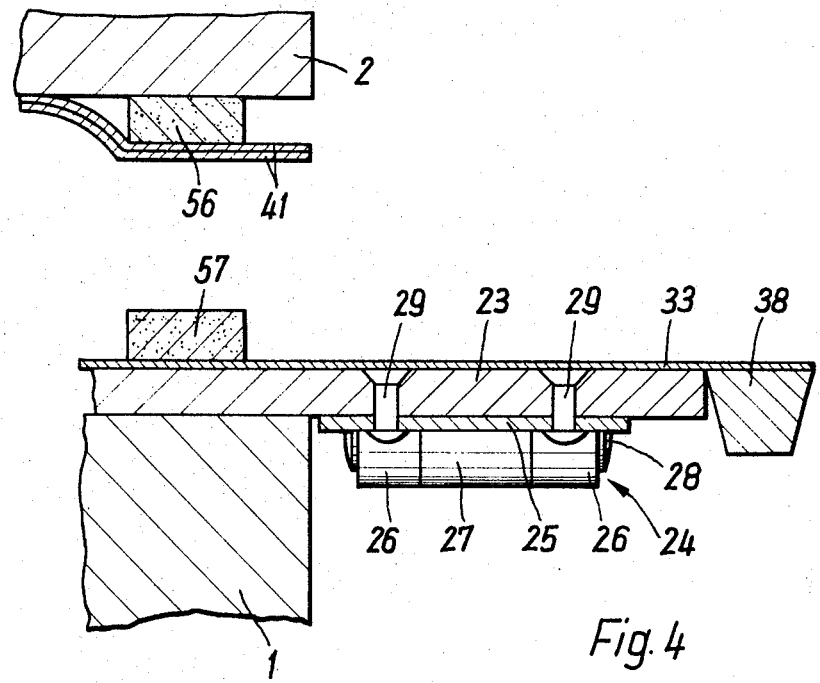
FIG. 4 represents a section taken along the line IV—IV of FIG. 3.
Figure 5:
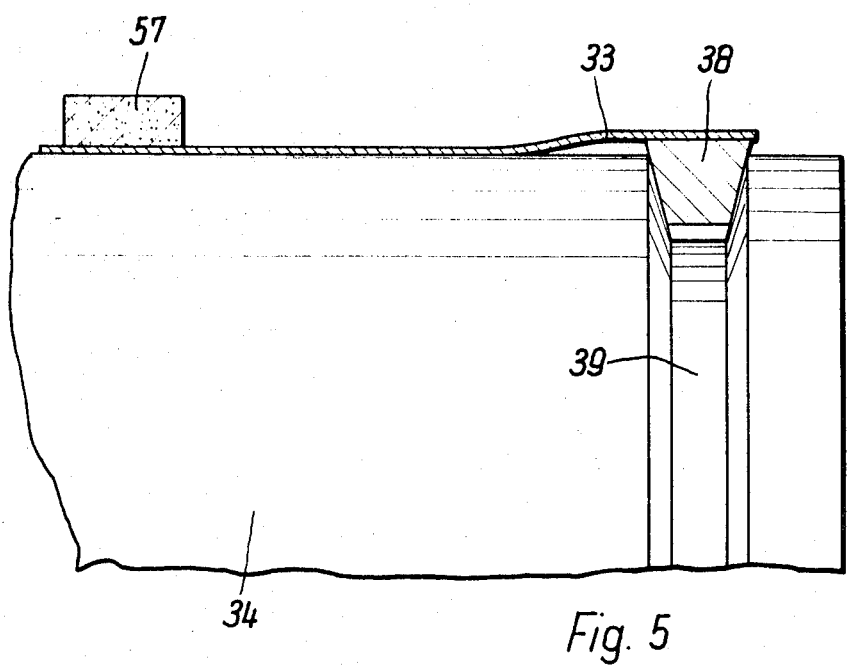
FIG. 5 illustrates on a larger scale than FIG. 1, a portion of FIG. 1 taken along the section V—V of FIG. 1.

If the above mentioned steps for cleaning the filter cloth and the grate band should not be sufficient, further washing and brushing devices may be provided within the region of the returning sections of the grate band and the filter cloth. Such additional washing and brushing devices are diagrammatically illustrated in the drawing and designated with the numerals 68 and 69. It may also be mentioned that a substantially plane press table is of advantage for a proper operation of the fruit press according to the invention, because such a table is always kept clean by the advancing transverse bars of the grate band so that a collection of slime in the troughs cannot occur while the grate band 6 can be kept clean by passing through corresponding cleaning stations. The provision of discharge troughs in the press table for increasing the discharge cross section is not particularly advantageous because these troughs cannot be kept clean in a simple manner. Therefore, the cross section of the bars and the distance between the bars is of major importance. The edges of the transverse bars of the grate band are rounded, as shown in FIG. 4, in order to avoid undue stresses of the associated filter cloth 33 at the ends of the bars.

It is, of course, to be understood that the present invention is, by no means, limited to the particular showing in the drawings, but also comprises any modifications within the scope of the appended claims.

What is claimed is:

1. In a press for pressing juice from fruit mash and the like: a bed member, a press punch moveable toward and away from the bed member and defining therewith a pressing space, said bed member having one end projecting beyond the corresponding end of said press punch and a charging device above said one end of said bed member, an endless grate band having an upper reach on top of said bed member and a lower reach beneath said bed member, said grate band comprising longitudinally spaced transverse bars and flexible elements at the ends of said bars interconnecting the bars, an endless filter cloth having an upper reach resting on top of the upper reach of said grate band and a lower reach beneath said bed member, deviating rollers at opposite ends of said bed member about which the grate band and filter cloth pass, said filter cloth and grate band being moveable to convey material supplied to the filter cloth by said charging device into pressing position in the press, drive means for intermittently driving said filter cloth and grate band a distance about equal to the length of the pressing space in the press, control means controlling the operation of at least said press punch for controlling the pressing of material in said pressing space, and a brush device spanning the grate band and having working movement thereof in a direction substantially parallel to longitudinal direction of transverse bars in combination therewith, said transverse bars being spaced apart such a distance that there is provided height greater than double the spacing from each other for the flow of liquid therebetween during a pressing operation to be substantially pressure free subject to complete cleaning being made possible between transverse bars to assure flow of liquid free of turbidity and unencumbered by adhering residue that would reduce cross section as to flow of liquid.

2. In a press for pressing juice from fruit mash and the like: a bed member, a press punch moveable toward and away from the bed member and defining therewith a pressing space, said bed member having one end projecting beyond the corresponding end of said press punch and a charging device above said one end of said bed member, an endless grate band having an upper reach on top of said bed member and a lower reach beneath said bed member, said grate band comprising longitudinally spaced transverse bars and flexible elements at the ends of said bars interconnecting the bars, an endless filter cloth having an upper reach resting on top of the upper reach of said grate band and a lower reach beneath said bed member, deviating rollers at opposite ends of said bed member about which the grate band and filter cloth pass, said filter cloth and grate band being moveable to convey material supplied to the filter cloth by said charging device into pressing position in the press, drive means for intermittently driving said filter cloth and grate band a distance about equal to the length of the pressing space in the press, control means controlling the operation of at least said press punch for controlling the pressing of material in said pressing space, said transverse bars being spaced apart such a distance that the flow of liquid therebetween during a pressing operation is substantially pressure free, elastic strips being mounted on said filter cloth along the lateral edges of the region where material to be pressed is deposited on the filter cloth, and elastic strips on said press punch arranged in opposition to the elastic strips on the filter cloth for cooperation therewith during a pressing operation to confine the material being pressed in the lateral direction.

3. In a press according to claim 2 in which said elastic strips are formed of a foamed material.

4. In a press for pressing juice from fruit mash and the like: a bed member, a press punch moveable toward and away from the bed member and defining therewith a pressing space, said bed member having one end projecting beyond the corresponding end of said press punch and a charging device above said one end of said bed member, an endless grate band having an upper reach on top of said bed member and a lower reach beneath said bed member, said grate band comprising longitudinally spaced transverse bars and flexible elements at the ends of said bars interconnecting the bars, an endless filter cloth having an upper reach resting on top of the upper reach of said grate band and a lower reach beneath said bed member, deviating rollers at opposite ends of said bed member about which the grate band and filter cloth pass, said filter cloth and grate band being moveable to convey material supplied to the filter cloth by said charging device into pressing position in the press, drive means for intermittently driving said filter cloth and grate band a distance about equal to the length of the pressing space in the press, control means controlling the operation of at least said press punch for controlling the pressing of material in said pressing space, said transverse bars being spaced apart such a distance that the flow of liquid therebetween during a pressing operation is substantially pressure free, V-belts being provided on said filter cloth at the inside of the marginal portions thereof and laterally outwardly from the lateral edges of said grate band, and deviating rollers for said filter cloth at the ends of the reaches thereof and grooved to receive said V-belts.

5. A press according to claim 4 which includes brush means for cleaning said grate band and moveable laterally to the grate band and substantially parallel to said transverse bars and engaging said grate band on the filter cloth side thereof.

6. In a press for pressing juice from fruit mash and the like: a bed member, a press punch moveable toward and away from the bed member and defining therewith a pressing space, said bed member having one end projecting beyond the corresponding end of said press punch and a charging device above said one end of said bed member, an endless grate band having an upper reach on top of said bed member and a lower reach beneath said bed member, said grate band comprising longitudinally spaced transverse bars and flexible elements at the ends of said bars interconnecting the bars, an endless filter cloth having an upper reach resting on top of the upper reach of said grate band and a lower reach beneath said bed member, deviating rollers at opposite ends of said bed member about which the grate band and filter cloth pass, said filter cloth and grate band being moveable to convey material supplied to the filter cloth by said charging device into pressing position in the press, drive means for intermittently driving said filter cloth and grate band a distance about equal to the length of the pressing space in the press, control means controlling the operation of at least said press punch for controlling the pressing of material in said pressing space, said transverse bars being spaced apart such a distance that the flow of liquid therebetween during a pressing operation is substantially pressure free, brush means for cleaning said grate band and moveable laterally to the grate band and substantially parallel to said transverse bars and engaging said grate band on the filter cloth side thereof, said brush means comprising an endless band having brush bodies thereon, and support rollers at the sides of said grate band for supporting said endless band and at least one roller being driven, said brush bodies engaging a substantial length of said grate band.

7. A press according to claim 6 in which said brush means engages said grate band outwardly from the end of said bed member which is opposite said charging device, and a collector beneath said grate band to receive material dislodged therefrom by said brush means.

8. A press according to claim 6 which includes a cover cloth on the side of said press punch which faces said bed member.

9. A press according to claim 6, in which said brush means is located at the exit side of the pressing space over an essentially horizontally extending section of said grate band and below said grate band there is a container for collecting pulp material which has been removed by said brush means.

10. A press according to claim 6, in which said filter cloth is free of restriction laterally outside of fruit mash receiving location.

11. A press according to claim 6 in which said bed member is substantially planar and said transverse bars are spaced apart about 3 millimeters while being about 8 millimeters in height, the corners of said bars facing said filter cloth being rounded.

12. A press according to claim 6 in which said filter cloth has a mesh of about 1 millimeter to about 5 millimeters, and has a weight of from about 200 grams up to about 800 grams per square meter.

* * * * *